US008953406B2

(12) United States Patent
Nishio et al.

(10) Patent No.: US 8,953,406 B2
(45) Date of Patent: Feb. 10, 2015

(54) SEMICONDUCTOR MODULE INCLUDES SEMICONDUCTOR CHIP INITIALIZED BY RESET SIGNAL

(75) Inventors: Yoji Nishio, Tokyo (JP); Takao Hirayama, Tokyo (JP); Susumu Hatano, Tokyo (JP); Haruki Nagahashi, Tokyo (JP); Masashi Kawamura, Tokyo (JP); Tadaaki Yoshimura, Tokyo (JP)

(73) Assignee: PS4 Luxco S.a.r.l., Luxembourg (LU)

( * ) Notice: Subject to any disclaimer, the term of this patent is extended or adjusted under 35 U.S.C. 154(b) by 372 days.

(21) Appl. No.: 13/455,985

(22) Filed: Apr. 25, 2012

(65) Prior Publication Data

US 2012/0268173 A1 Oct. 25, 2012

(30) Foreign Application Priority Data

Apr. 25, 2011 (JP) ................... 2011-097521

(51) Int. Cl.
*G11C 8/00* (2006.01)
*G06F 13/40* (2006.01)

(52) U.S. Cl.
CPC .................. *G06F 13/4086* (2013.01)
USPC .................. 365/230.03; 365/185.11

(58) Field of Classification Search
USPC .......................... 365/230.03, 185.11, 233.14
See application file for complete search history.

(56) References Cited

U.S. PATENT DOCUMENTS

| 2002/0085418 A1* | 7/2002 | Goto et al. ............... 365/185.11 |
| 2005/0052912 A1* | 3/2005 | Cogdill et al. ............... 365/202 |
| 2008/0106757 A1* | 5/2008 | Asauchi ...................... 358/1.15 |
| 2008/0313374 A1* | 12/2008 | Gower et al. ................. 710/110 |

FOREIGN PATENT DOCUMENTS

JP 2007-095278 4/2007

* cited by examiner

*Primary Examiner* — Vu Le

(57) ABSTRACT

Disclosed herein is a device that includes a plurality of semiconductor chips mounted on a module substrate. Each of the semiconductor chips includes a reset terminal to which a reset signal is supplied, and an internal circuit that is initialized based on the reset signal. The module substrate includes a reset signal line connected commonly to the reset terminals of the semiconductor chips, and an anti-resonance element connected to the reset signal line.

14 Claims, 27 Drawing Sheets

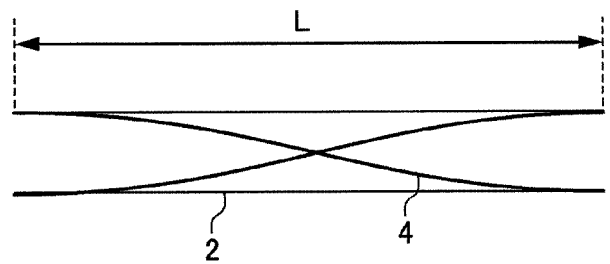
FIG.1A  $L=\lambda/2$
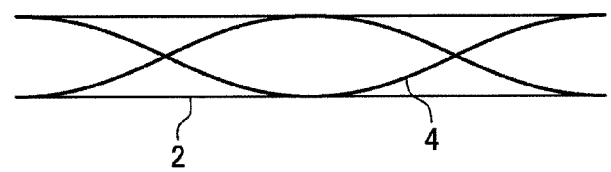
FIG.1B  $L=2\cdot\lambda/2$
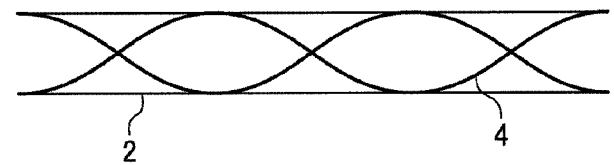
FIG.1C  $L=3\cdot\lambda/2$
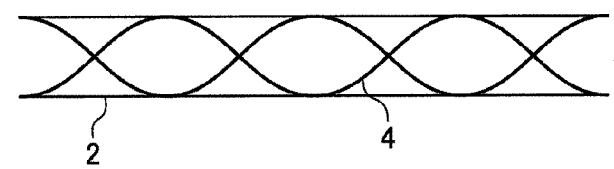
FIG.1D  $L=4\cdot\lambda/2$
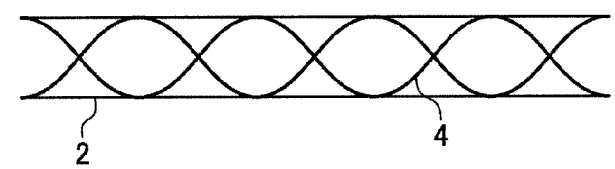
FIG.1E  $L=5\cdot\lambda/2$

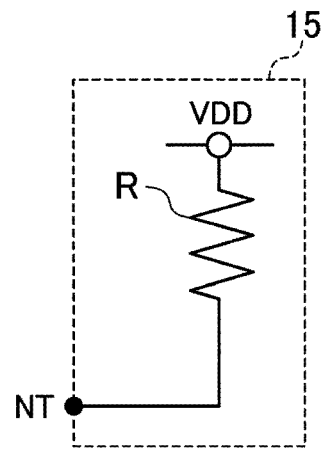
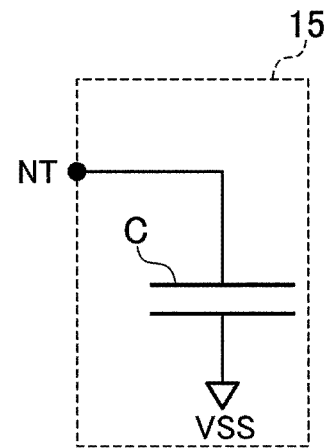
FIG.7A  FIG.7B
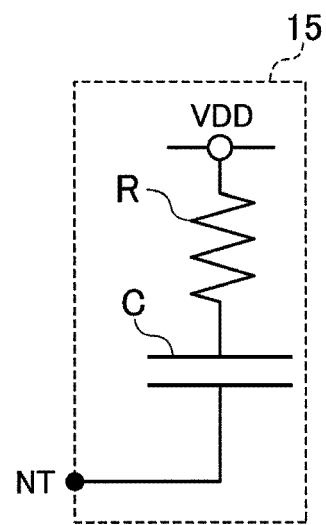
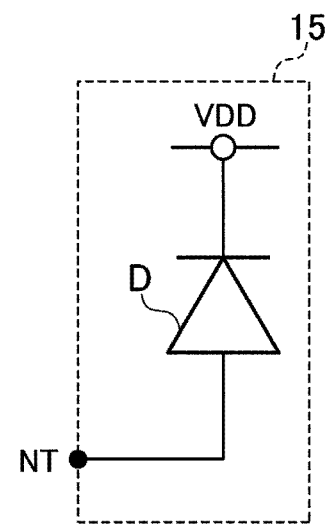
FIG.7C  FIG.7D

|  | n=1 RESONANT FREQUENCY =266MHz | 2 133MHz | 3 89MHz | 4 67MHz |
|---|---|---|---|---|
| N | d | d | d | d |
| 1 FUNDAMENTAL VIBRATION | 213mm | 426mm | 639mm | 852mm |
| 2 DOUBLEL VIBRATION | 426mm | 852mm | 1278mm | 1704mm |
| 3 TRIPLE VIBRATION | 639mm | 1278mm | 1917mm | 2556mm |
| 4 QUADRUPLE VIBRATION | 852mm | 1704mm | 2556mm | 3408mm |
| 5 QUINTUPLE VIBRATION | 1065mm | 2130mm | 3195mm | 4260mm |

FIG.21A

|  | n=1 RESONANT FREQUENCY =333MHz | 2 167MHz | 3 111MHz | 4 83MHz |
|---|---|---|---|---|
| N | d | d | d | d |
| 1 FUNDAMENTAL VIBRATION | 143mm | 286mm | 429mm | 572mm |
| 2 DOUBLEL VIBRATION | 286mm | 572mm | 858mm | 1144mm |
| 3 TRIPLE VIBRATION | 429mm | 858mm | 1287mm | 1716mm |
| 4 QUADRUPLE VIBRATION | 572mm | 1144mm | 1716mm | 2288mm |
| 5 QUINTUPLE VIBRATION | 715mm | 1430mm | 2145mm | 2860mm |

FIG.21B

SEMICONDUCTOR MODULE INCLUDES SEMICONDUCTOR CHIP INITIALIZED BY RESET SIGNAL

BACKGROUND OF THE INVENTION

1. Field of the Invention

The present invention relates to a semiconductor module and a motherboard having the semiconductor module mounted thereon, and more particularly relates to a semiconductor module supplied with a signal of which the logic level is fixed during a normal operation, such as a reset signal, and a signal of which the logic level changes during a normal operation, such as an address signal, and a motherboard having the semiconductor module mounted thereon.

2. Description of Related Art

A semiconductor chip such as a DRAM (Dynamic Random Access Memory) has a reset terminal for receiving a reset signal in some cases (see Japanese Patent Application Laid-open No. 2007-95278). The reset signal is activated at the time of start-up immediately after power supply or the like, thereby initializing the entire chip. Because the reset signal is activated only when the entire chip needs to be initialized, the reset signal is fixed to an inactive level during the normal operation after the start-up.

However, a phenomenon sometimes occurs that, although the reset signal is properly fixed to an inactive level by a controller, the reset signal is incidentally activated, so that the semiconductor chip is initialized.

SUMMARY

Intensive studies by the inventors of the present invention about causes of this phenomenon have revealed that a resonance phenomenon is produced on a reset signal line due to crosstalk from another signal line, which activates the reset signal without intending to do so.

As a result of further studies, the inventors have found some means to prevent the resonance phenomenon on the reset signal line. One of such means is a method in which an anti-resonance element is connected to the reset signal line. Another means is to design the reset signal line to a length that causes no resonance considering a frequency or the like of a signal source as a factor of crosstalk. Still another means is to avoid an open tube configuration to cause the reset signal line to be inherently resistant to resonances. The present invention has been achieved based on these technological findings.

In one embodiment, there is provided a semiconductor module that includes: a plurality of semiconductor chips each including a reset terminal to which a reset signal is supplied, and an internal circuit that is initialized based on the reset signal; and a module substrate on which the semiconductor chips are mounted. The module substrate comprises a reset signal line connected commonly to the reset terminals of the semiconductor chips, and an anti-resonance element connected to the reset signal line.

In another embodiment, there is provided a semiconductor module that includes: a module substrate; first and second signal lines that are provided along each other on the module substrate; a semiconductor chip that is mounted on the module substrate and to which first and second signals are supplied through the first and second signal lines, respectively; and an anti-resonance element connected to the first signal line, wherein the first signal is activated to a first logic level at a time of start-up and fixed to a second logic level during a normal operation after the start-up, the second signal changes between the first logic level and the second logic level during the normal operation, and the anti-resonance element fixes the first signal to the second logic level to prevent periodic changes of the second signal during the normal operation from causing resonances on the first signal line due to crosstalk from the second signal line to the first signal line.

In one embodiment, there is provided a semiconductor device comprising: a motherboard; a semiconductor module mounted on the motherboard; and a controller mounted on the motherboard and supplying a reset signal to the semiconductor module. The semiconductor module includes: a plurality of semiconductor chips each including a reset terminal to which the reset signal is supplied, and an internal circuit that is initialized based on the reset signal; and a module substrate on which the semiconductor chips are mounted. The module substrate comprises a reset signal line connected commonly to the reset terminals of the semiconductor chips, and an anti-resonance element connected to the reset signal line.

BRIEF DESCRIPTION OF THE DRAWINGS

FIGS. 1A to 1E are schematic diagrams for explaining resonant mode of an open tube;

FIGS. 7A to 7D are schematic diagrams indicative of embodiments of some termination elements that can be used for the anti-resonance element 15;

FIGS. 21A and 21B are tables indicative of relations between the resonant frequency and the line length;

DETAILED DESCRIPTION OF THE EMBODIMENTS

Figure 2:
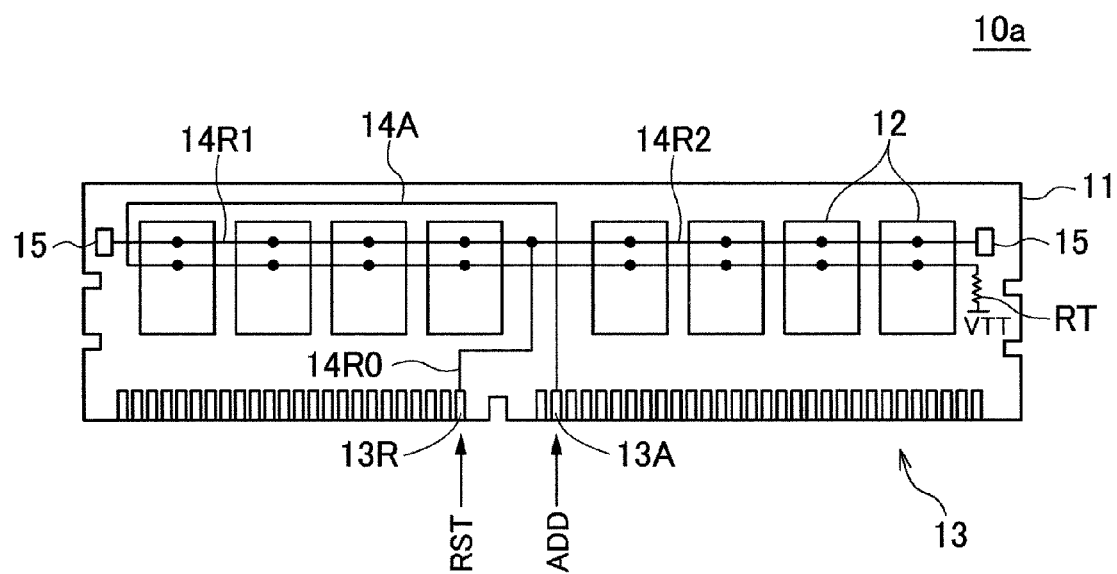
FIG. 2 is a schematic diagram indicative of an embodiment of a configuration of a semiconductor module 10a according to a first embodiment of the present invention.

Before explaining embodiments of the present invention, a generation mechanism of a resonance phenomenon, which is an issue of the present invention, is explained with an example in which an excitation source is an address signal and an excitation target is a reset signal.

A reset signal line causes resonances in cases where the reset signal line for transmitting the reset signal functions as an open tube. The open tube has resonant modes with "antinodes" on both ends. Assuming that the length of the open tube is L, a relation $L=\lambda/2$ is established at a fundamental vibration frequency as shown in FIG. 1A and resonances occur also at frequencies equal to integral multiples of the fundamental vibration frequency as shown in FIGS. 1B to 1E. Reference numeral 2 in FIGS. 1A to 1E denotes an open tube having the length L, and 4 denotes a resonating reset signal.

As shown in FIGS. 1A, 1C, and 1E, the both ends of the open tube have opposite phases in the resonant modes at frequencies equal to odd multiples of the fundamental vibration frequency, and thus the resonant modes at the frequencies equal to odd multiples of the fundamental vibration frequency are likely to occur when conditions to excite the both ends of the open tube to opposite phases are met. An example of the conditions to excite the both ends of the open tube to opposite phases is a case where an address signal on an address signal line adjacent to one end of the open tube and an address signal on an address signal line adjacent to the other end of the open tube are different signals and these address signals incidentally have opposite phases.

On the other hand, the both ends of the open tube have the same phase in resonant modes at frequencies equal to even multiples of the fundamental vibration frequency as shown in FIGS. 1B and 1D and thus the resonant modes at the frequencies equal to even multiples of the fundamental vibration frequency are likely to occur under conditions in which the both ends of the open tube are excited to the same phase. An example of the conditions in which the both ends of the open tube are excited to the same phase is a case where address signals on address signal lines adjacent to one end of the open tube and the other end thereof, respectively, are the same signal.

When the reset signal line causes a resonance, the reset signal oscillates with a level quite larger than that of noises only produced by crosstalk. Accordingly, the reset signal that is never inverted only by crosstalk may be inverted due to the resonance. To prevent this resonance phenomenon, such means that an anti-resonance element is connected to the reset signal line, the reset signal line is designed to a length that causes no resonance, and the reset signal line is designed not to have an open tube configuration are conceivable. While these means can be used separately, it is more effective to combine two or three means.

Preferable embodiments of the present invention are explained below in detail with reference to the accompanying drawings.

Turning to FIG. 2, the semiconductor module 10a according to the first embodiment includes a module substrate 11 and a plurality of semiconductor chips 12 mounted on the module substrate 11. Although types of the semiconductor chips 12 are not particularly limited, an example thereof is a semiconductor memory such as a DRAM. When the semiconductor memory such as the DRAM is used for the semiconductor chips 12, the semiconductor module 10a constitutes a memory module.

Figure 3:
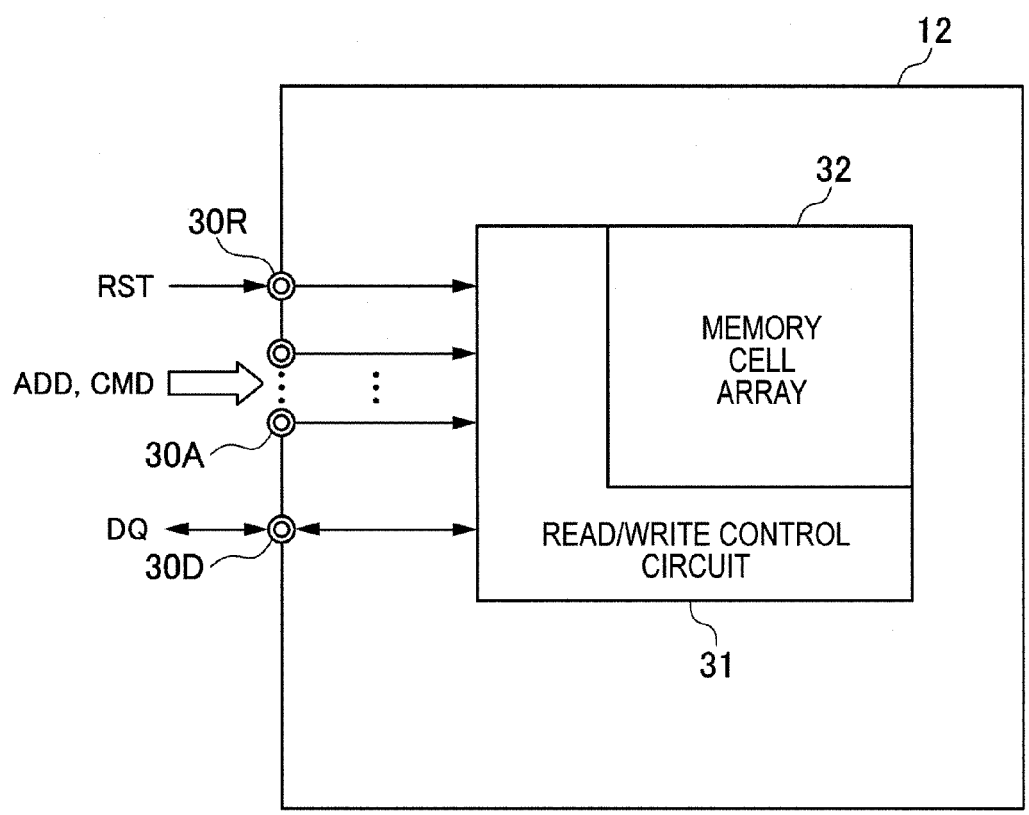
FIG. 3 is a schematic block diagram indicative of an embodiment of a configuration of the semiconductor chip 12 when the semiconductor chip 12 is a DRAM.

Turning to FIG. 3, when the semiconductor chip 12 is a DRAM, the semiconductor chip 12 includes at least an address/command terminal 30A, a data input/output terminal 30D, and a reset terminal 30R as external terminals. These terminals 30A, 30D, and 30R are connected to a read/write control circuit 31. The read/write control circuit 31 controls accesses to a memory cell array 32, and an address to be accessed is specified by an address signal ADD supplied through the address/command terminal 30A. Therefore, when a command CMD supplied through the address/command terminal 30A specifies a read operation, data stored at an address specified by the address signal ADD among data stored in the memory cell array 32 are output from the data input/output terminal 30D. When a command CMD supplied through the address/command terminal 30A specifies a write operation, data input from the data input/output terminal 30D are written at an address specified by the address signal ADD.

The reset terminal 30R is a terminal to which a reset signal RST is input, and internal circuits of the semiconductor chip 12 are reset when the reset signal RST is activated. The internal circuits indicate all circuits of the semiconductor chip 12 including the read/write control circuit 31 and the memory cell array 32.

Figure 4:
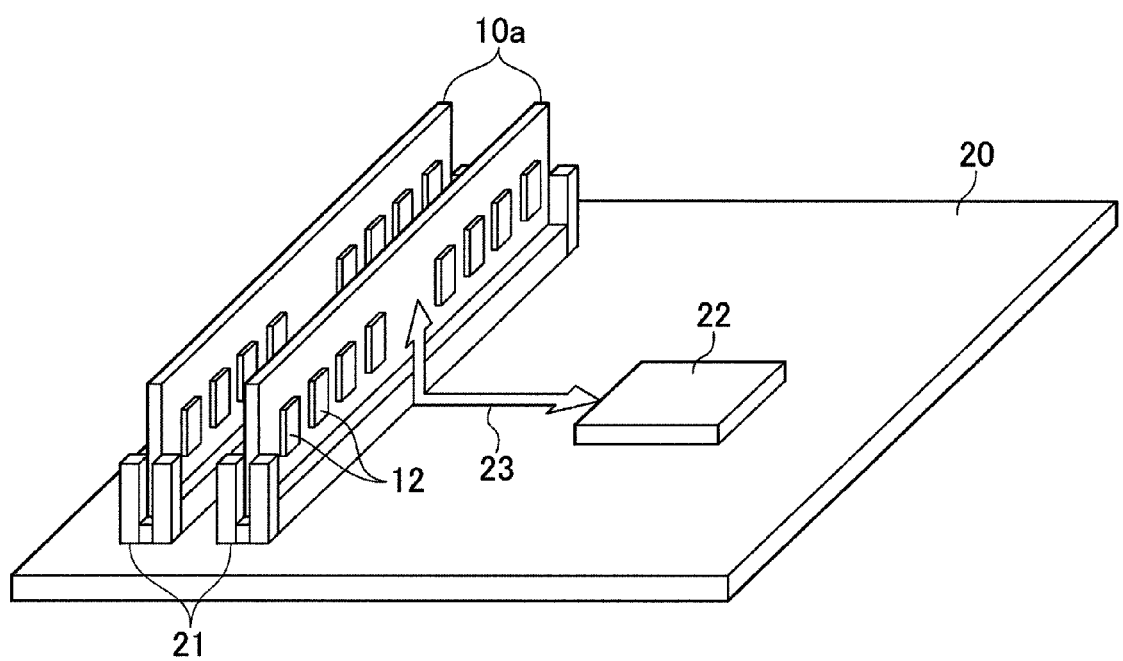
FIG. 4 is a schematic diagram indicative of an embodiment of a motherboard 20 on which the semiconductor module 10a is mounted.

In practical use, the semiconductor module 10a is mounted on a motherboard 20 as shown in FIG. 4. The motherboard 20 has a slot 21, and the semiconductor module 10a is inserted into the slot 21. A controller 22 is mounted on the motherboard 20 and is connected to the semiconductor module 10a through a line 23 and the slot 21 provided on the motherboard 20. The controller 22 is a semiconductor chip for controlling the semiconductor module 10a. Therefore, when the semiconductor module 10a is a memory module, a memory controller is used for the controller 22.

Figure 5:
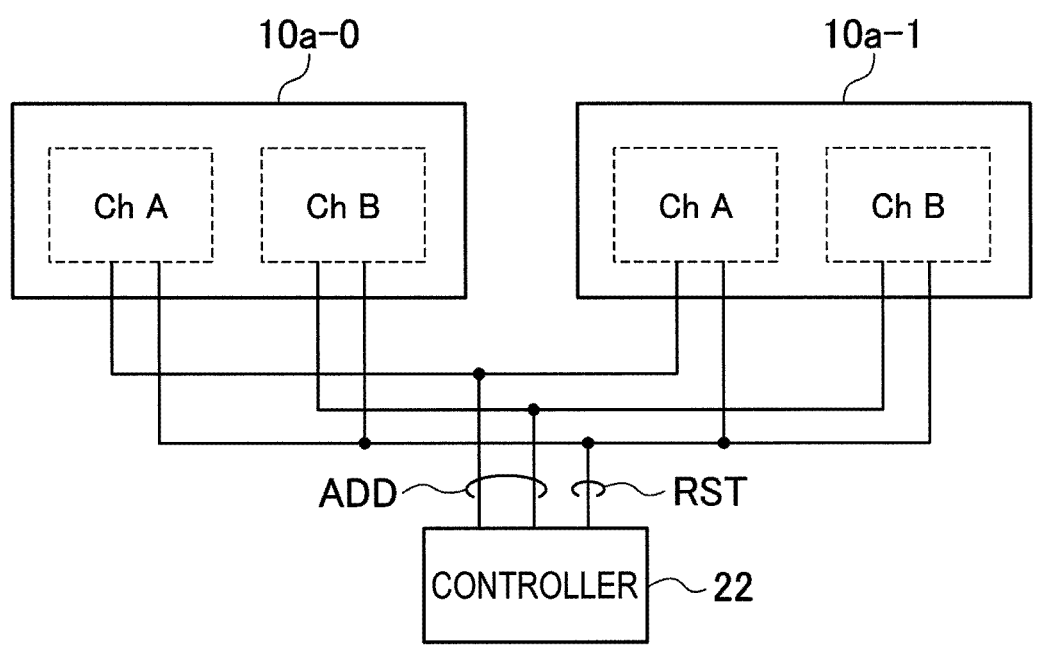
FIG. 5 is a schematic diagram indicative of an embodiment of wiring on the motherboard 20.

As shown in FIG. 4, a plurality of slots 21 can be formed on the motherboard 20. The semiconductor modules 10a inserted into the slots 21 are separately or commonly connected to the controller 22. In an example where a semiconductor module 10a-0 is inserted into one of the slots 21 and a semiconductor module 10a-1 is inserted into the other slot 21 as shown in FIG. 5, semiconductor chips belonging to a channel ChA among semiconductor chips included in the semiconductor modules 10a-0 and 10a-1 are commonly connected to the controller 22. Similarly, semiconductor chips belonging to a channel ChB are commonly connected to the controller 22. In this example, the channels ChA and ChB operate separately and thus output timings and logic levels of a signal (the address signal ADD, for example) supplied from the controller 22 to the channel ChA and a signal (the address signal ADD, for example) supplied from the controller 22 to the channel ChB have no relation with each other. Even in this case, however, a common line is sometimes used for the channels ChA and ChB with respect to the reset signal RST.

Referring back to FIG. 2, a plurality of terminals 13 to be connected to electrodes on the slot 21 are provided on the module substrate 11. Therefore, for example, the address signal ADD, the command signal CMD, the reset signal RST and the like output from the controller 22 are supplied to the semiconductor chips 12 through the corresponding terminals 13, and data DQ to be transmitted or received between the semiconductor chips 12 and the controller 22 are communicated through the corresponding terminals 13.

A terminal 13A shown in FIG. 2 is a terminal to which the address signal ADD is input, and a terminal 13R is a terminal to which the reset signal RST is input. The address signal ADD is a signal for specifying an address to be accessed in the semiconductor chip 12. The reset signal RST is a signal for resetting the semiconductor chip 12. Although not particularly limited, when the semiconductor chip 12 is a DDR3 (Double Data Rate 3) DRAM, an active level of the reset signal RST is a low level. The reset signal RST is temporally brought to a low level at the time of start-up after power supply and is fixed to a high level (an inactive level) during subsequent normal operations.

Threshold voltages for discriminating between a low level and a high level are set to prevent the reset signal RST from erroneously changing to the low level during a normal operation. Specifically, threshold voltages for other signals such as the high-speed address signal ADD are set to near an intermediate level (VDD/2) of a power supply voltage VDD, while a high-level threshold voltage for the reset signal RST is set to 0.8 VDD and a low-level threshold voltage therefor is set to a level as high as 20% (VDD/5) of the power supply voltage VDD. As an example, when the power supply voltage VDD is 1.5 V (volts), the threshold voltages for the other signals such as the address signal ADD are set to about 0.75 V±150 mV (millivolts), while the high-level threshold voltage for the reset signal RST is set to 1.2 V and the low-level threshold voltage therefor is set to 0.3 V. Such offset of the threshold voltages reduces a risk of erroneously inverting the reset signal RST into the low level. However, as explained above, when noises due to crosstalk cause resonances, the reset signal RST may exceed the high-level threshold to be inverted into the low level. This problem is overcome by addition of an anti-resonance element, which will be explained later.

As shown in FIG. 2, the address signal ADD and the reset signal RST are supplied commonly to the semiconductor chips 12 on the module substrate 11. More specifically, an address signal line 14A for transmitting the address signal ADD is connected to the semiconductor chips 12 by a fly-by method (a traversable method) and has a termination connected to a termination voltage VTT through a termination resistor RT. On the other hand, a reset signal line 14R for transmitting the reset signal RST includes a common line 14R0 connected to the reset terminal 13R and branch lines 14R1 and 14R2 that branch from the common line 14R0, and half of the semiconductor chips 12 are connected to the branch line 14R1 and the other half of the semiconductor chips 12 are connected to the branch line 14R2.

The address signal line 14A and the reset signal lines 14R1 and 14R2 have portions that adjacently run side by side on the module substrate 11. Accordingly, crosstalk occurs between the address signal line 14A and the reset signal lines 14R1 and 14R2. However, the logic level of the reset signal RST is fixed to a high level during a normal operation and thus no crosstalk occurs from the reset signal lines 14R1 and 14R2 to the address signal line 14A. On the other hand, the logic level of the address signal ADD rapidly changes during the normal operation and accordingly crosstalk from the address signal line 14A to the reset signal lines 14R1 and 14R2 becomes a problem.

In the first embodiment, anti-resonance elements 15 are connected to the terminations of the reset signal lines 14R1 and 14R2, respectively, to prevent noises due to crosstalk from causing resonances. The anti-resonance elements 15 function not to bring a reset signal system into an open tube to prevent periodic changes of the address signal ADD during the normal operation from causing resonances on the reset signal lines 14R1 and 14R2 due to crosstalk from the address signal line 14A to the reset signal lines 14R1 and 14R2, so that the reset signal RST is fixed to a high level.

Figure 6A:
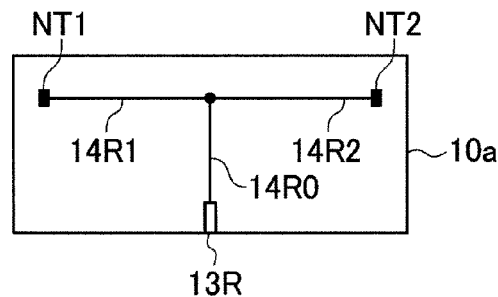
FIGS. 6A to 6C are schematic diagrams for explaining a length of a reset signal line 14R when a resonance occurs.
Figure 6B:
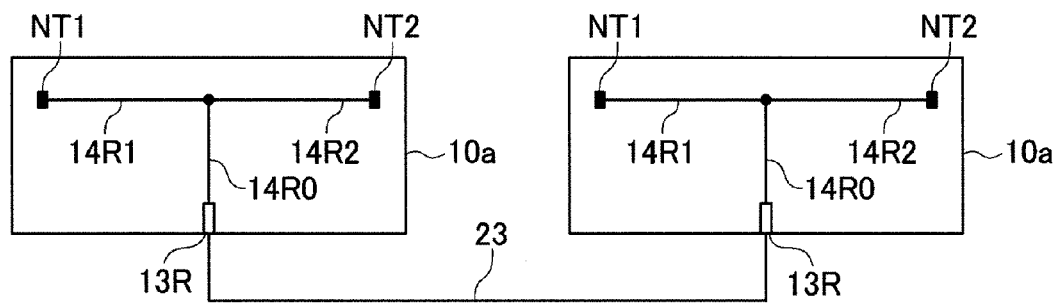

As explained with reference to FIG. 1, resonances occur when the line length L and the signal frequency λ have predetermined relations. In this case, the line length L corresponds to a distance between ends NT1 and NT2 of the reset signal lines 14R1 and 14R2 that branch as shown in FIG. 6A. When a plurality of semiconductor modules 10a are commonly connected with the line 23 on the motherboard as shown in FIG. 6B, the line length L also corresponds to a distance from an end NT1 or NT2 on one semiconductor module 10a to an end NT1 or NT2 on another semiconductor module 10a. This means that there are plural lengths L depending on system configurations. The frequency λ corresponds to a frequency of a signal that can periodically change, and corresponds to a frequency of the address signal ADD in the first embodiment. The frequency of the address signal ADD depends on a frequency of a basic clock. Because the frequency of the basic clock can be changed in many cases, plural frequencies λ are assumed even in one semiconductor module 10a. Therefore, the anti-resonance element 15 is required to have a characteristic that enables to prevent resonances possibly occurring depending on combinations of the plural lengths L and the plural frequencies λ.

Turning to FIGS. 7A to 7D, these termination elements all have a function not to bring the reset signal system into an open tube.

FIG. 7A shows an example in which a resistive element R is used for the anti-resonance element 15. One end of the resistive element R is connected to an end NT (the ends NT1 and NT2 in the example shown in FIG. 2) of the reset signal line 14R, and the other end of the resistive element R is connected to a power supply potential VDD. When the resistive element R is used for the anti-resonance element 15, a current flows through the resistive element R when the level of the reset signal line 14R reduces, thereby preventing reduction in the level of the reset signal line 14R.

FIG. 7B shows an example in which a capacitive element C is used for the anti-resonance element 15. One end of the capacitive element C is connected to an end NT (the ends NT1 and NT2 in the example shown in FIG. 2) of the reset signal line 14R, and the other end of the capacitive element C is connected to a ground potential VSS. When the capacitive element C is used for the anti-resonance element 15, the capacitive element C is always charged to the power supply voltage VDD, thereby preventing reduction in the level of the reset signal line 14R. The other end of the capacitive element C can be connected to the power supply potential VDD instead of the ground potential VSS.

FIG. 7C shows an example in which a series circuit of a resistive element R and a capacitive element C is used for the anti-resonance element 15. One end of the capacitive element C is connected to an end NT (the ends NT1 and NT2 in the example shown in FIG. 2) of the reset signal line 14R, and one end of the resistive element R is connected to a power supply potential VDD. When the series circuit of the resistive element R and the capacitive element C is used for the anti-resonance element 15, the series circuit functions as a time constant circuit, that is, a so-called AC termination, which prevents reduction in the level of the reset signal line 14R. The one end of the resistive element R can be connected to a ground potential VSS instead of the power supply potential VDD.

FIG. 7D shows an example in which a diode D is used for the anti-resonance element 15. An anode of the diode D is connected to an end NT (the ends NT1 and NT2 in the example shown in FIG. 2) of the reset signal line 14R, and a cathode of the diode D is connected to a power supply potential VDD. When the diode D is used for the anti-resonance element 15, the same function as in the circuit shown in FIG. 7B is realized.

When an element constant of the anti-resonance element 15 is appropriately selected according to a combination of the length L and the frequency λ, occurrence of resonances on the reset signal line 14R due to noises resulting from crosstalk is prevented.

Figure 8:
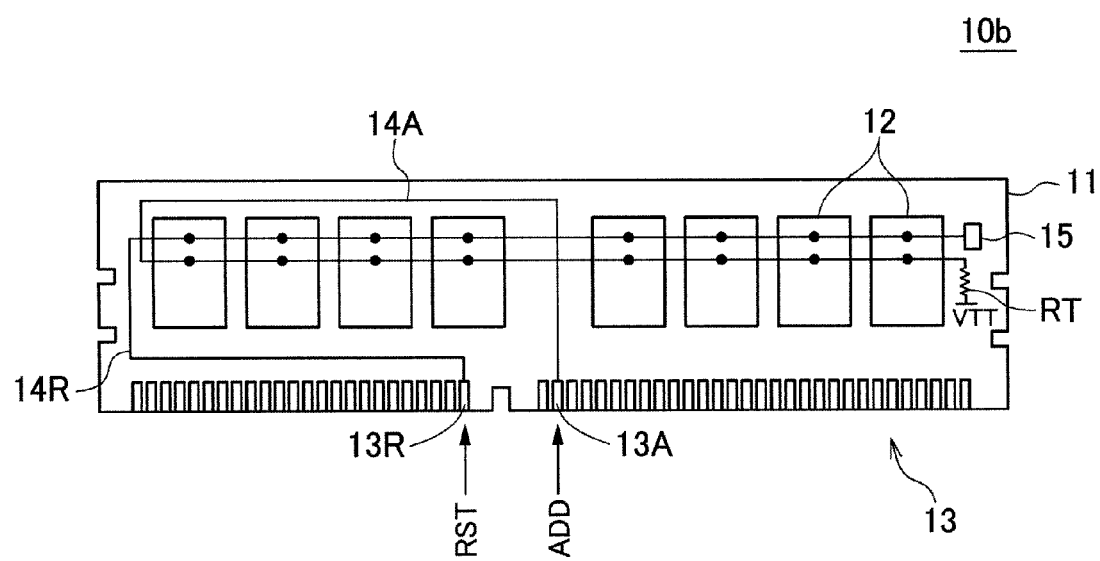
FIG. 8 is a schematic diagram indicative of an embodiment of a configuration of a semiconductor module 10b according to a second embodiment of the present invention.

Turning to FIG. 8, the semiconductor module 10b is different from the semiconductor module 10a shown in FIG. 2 in that the reset signal line 14R is connected to the semiconductor chips 12 by a fly-by method (a traversable method). Because other features of the semiconductor module 10b are the same as those in the semiconductor module 10a shown in FIG. 2, like elements are denoted by like references and redundant explanations thereof will be omitted.

Figure 6C:
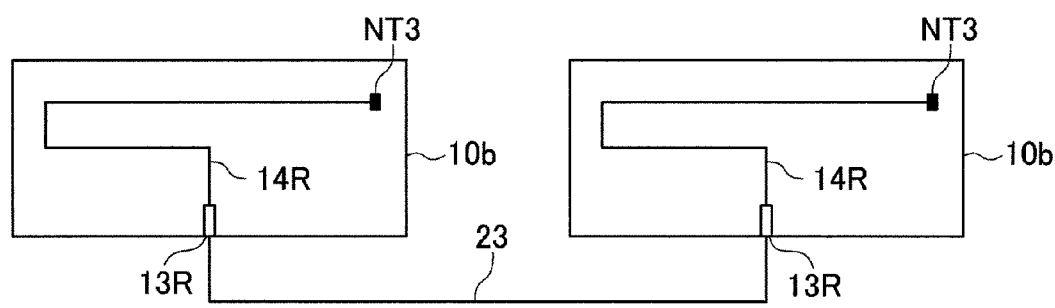

Also in the second embodiment, the anti-resonance element 15 is connected to a termination of the reset signal line 14R. Because the reset signal line 14R has only one termination in the second embodiment, no open tube is formed on a single semiconductor module 10b. However, when a plurality of the semiconductor modules 10b are commonly connected through the line 23 on the motherboard as shown in FIG. 6C, an open tube is formed and resonances occur according to a length L between an end NT3 on one of the semiconductor modules 10b and an end NT3 on another semiconductor module 10b. Therefore, in the second embodiment, it suffices to select an element constant of the anti-resonance element 15 considering the length L through the line 23 on the motherboard.

Figure 9:
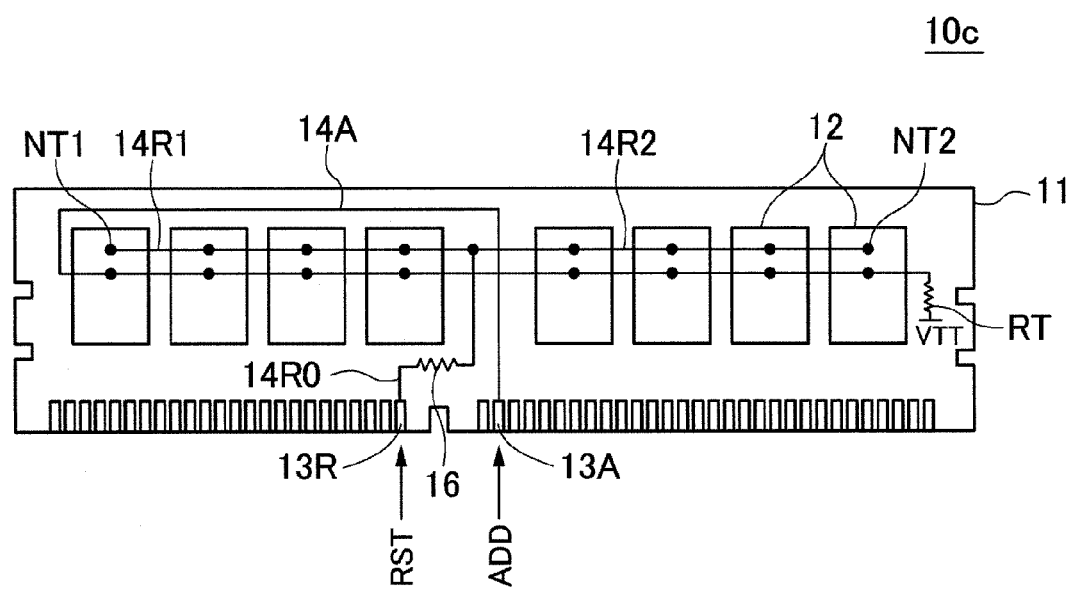
FIG. 9 is a schematic diagram indicative of an embodiment of a configuration of a semiconductor module 10c according to a third embodiment of the present invention.

Turning to FIG. 9, the semiconductor module 10c is different from the semiconductor module 10a shown in FIG. 2 in that the anti-resonance elements 15 are eliminated and a resistive element 16 is inserted in the reset signal line 14R instead. Because other features of the semiconductor module 10c are the same as those in the semiconductor module 10a shown in FIG. 2, like elements are denoted by like references and redundant explanations thereof will be omitted.

The resistive element 16 functions to attenuate changes in the level on the reset signal line 14R. While the resistive element 16 is inserted into the common line 14R0 of the reset signal line 14R in the third embodiment, the resistive element 16 can be additionally inserted into the branch line 14R1 or 14R2. In the third embodiment, while the terminations NT1 and NT2 of the reset signal line 14R are opened, insertion of the resistive element 16 can suppress changes in the level on the reset signal line 14R, thereby preventing occurrence of resonances. Although not shown, it is possible to insert the resistive element 16 into the reset signal line 14R and also connect the anti-resonance element 15 to the terminations NT1 and NT2 of the reset signal line 14R.

Figure 10:
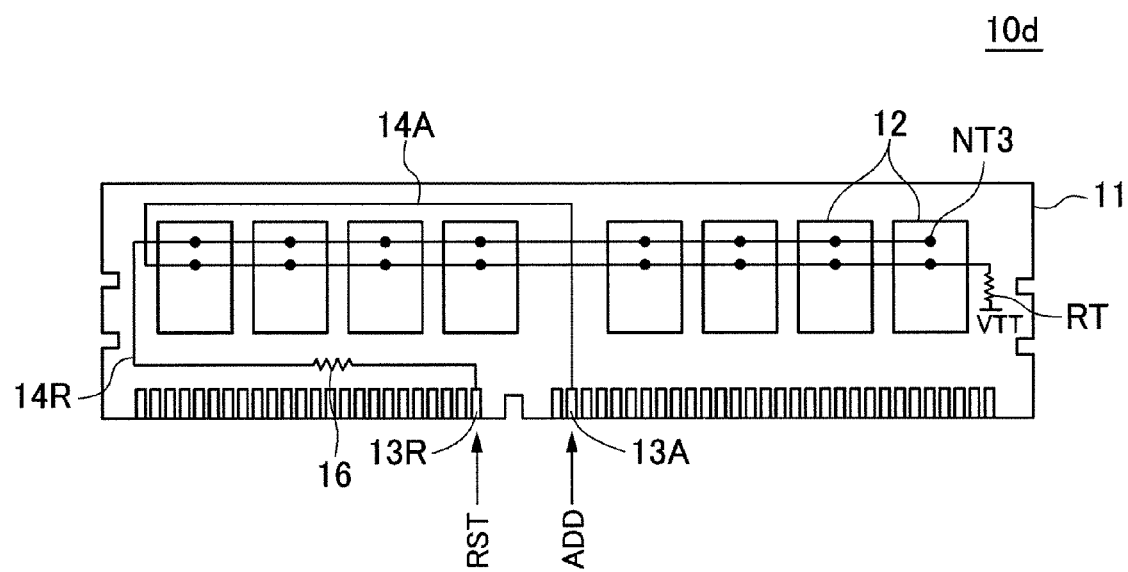
FIG. 10 is a schematic diagram indicative of an embodiment of a configuration of a semiconductor module 10d according to a fourth embodiment of the present invention.

Turning to FIG. 10, the semiconductor module 10d is different from the semiconductor module 10b shown in FIG. 8 in that the anti-resonance element 15 is eliminated and the resistive element 16 is inserted into the reset signal line 14R instead. Because other features of the semiconductor module 10d are the same as those in the semiconductor module 10b shown in FIG. 8, like elements are denoted by like references and redundant explanations thereof will be omitted. While the termination NT3 of the reset signal line 14R is opened also in the fourth embodiment, insertion of the resistive element 16 suppresses changes in the level on the reset signal line 14R, so that occurrence of resonances can be prevented. Although not shown, it is possible to insert the resistive element 16 into the reset signal line 14R and also connect the anti-resonance element 15 to the termination NT3 of the reset signal line 14R.

Figure 11:
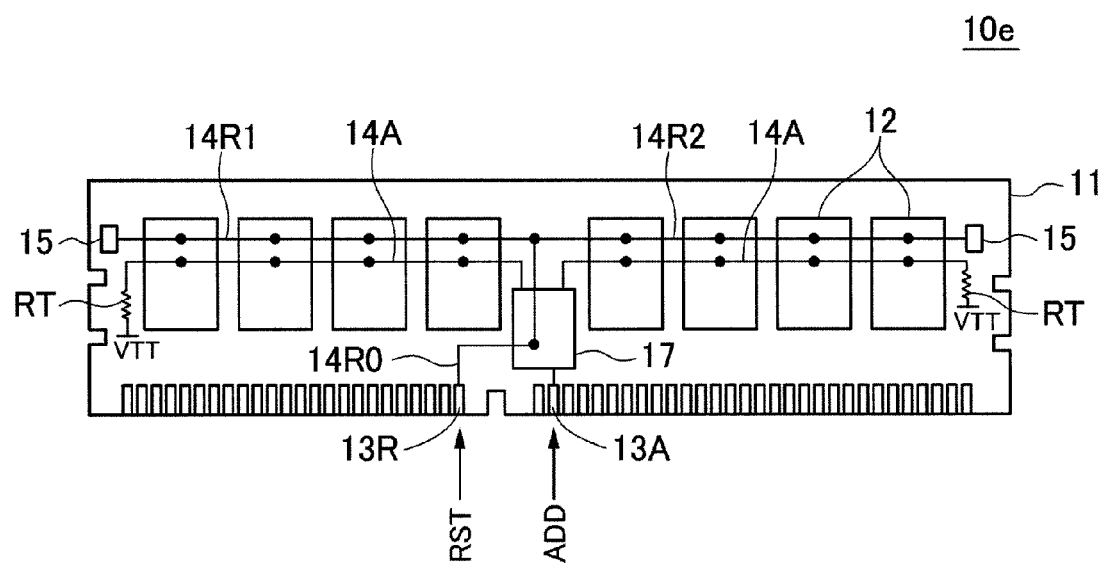
FIG. 11 is a schematic diagram indicative of an embodiment of a configuration of a semiconductor module 10e according to a fifth embodiment of the present invention.

Turning to FIG. 11, the semiconductor module 10e is greatly different from the semiconductor module 10a shown in FIG. 2 in that a register buffer 17 is mounted on the module substrate 11. The register buffer 17 is a semiconductor chip that buffers the address signal ADD, the command signal CMD and the like. The address signal ADD, the command signal CMD and the like output from the controller 22 on the motherboard are temporarily input to the register buffer 17, and the address signal ADD, the command signal CMD and the like buffered in the register buffer 17 are supplied to each of the semiconductor chips 12. At that time, in a normal configuration, the address signal ADD supplied to the left half of the semiconductor chips 12 and the address signal ADD supplied to the right half thereof have opposite polarities. This is to prevent simultaneous switching noises or to reduce a termination current (a VTT current) flowing through a connector. There is also a memory module that has a memory buffer mounted thereon instead of the register buffer 17.

The reset signal RST is also supplied to the register buffer 17. However, the register buffer 17 does not buffer the reset signal RST, and the reset signal RST is commonly connected to the reset signal line 14R in the same manner as the semiconductor chips 12. When the reset signal RST is activated, the register buffer 17 is also reset.

Because other features of the semiconductor module 10e are the same as those in the semiconductor module 10a shown in FIG. 2, like elements are denoted by like references and redundant explanations thereof will be omitted. Also in the fifth embodiment, the same effect as that in the semiconductor module 10a shown in FIG. 2 can be obtained. While the reset signal line 14R branches in the example shown in FIG. 11, the reset signal line 14R can be connected to the semiconductor chips 12 by a fly-by method as in the example shown in FIG. 8.

Figure 12:
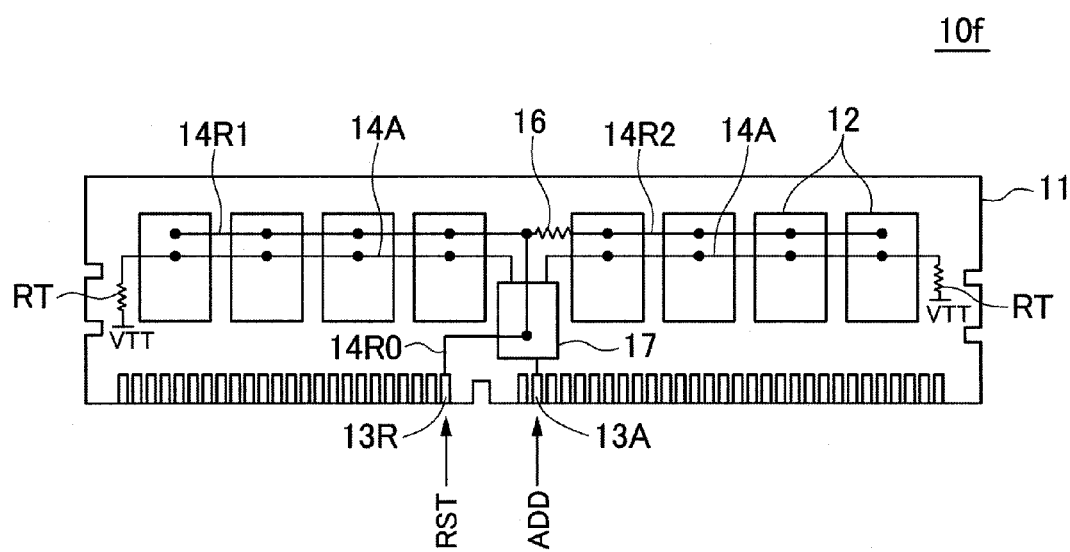
FIG. 12 is a schematic diagram indicative of an embodiment of a configuration of a semiconductor module 10f according to a sixth embodiment of the present invention.

Turning to FIG. 11, the semiconductor module 10f is greatly different from the semiconductor module 10c shown in FIG. 9 in that the register buffer 17 is mounted on the module substrate 11. Because other features of the semiconductor module 10f are the same as those in the semiconductor module 10c shown in FIG. 9, like elements are denoted by like references and redundant explanations thereof will be omitted. Also in the sixth embodiment, the same effect as that in the semiconductor module 10c shown in FIG. 9 can be obtained. While the resistive element 16 is inserted into the branch line 14R2 in the example shown in FIG. 12, the resistive element 16 can be additionally inserted into the common line 14R0. The reset signal line 14R branches in the example shown in FIG. 12. However, the reset signal line 14R can be connected to the semiconductor chips 12 by a fly-by method as in the example shown in FIG. 10. In this case, it suffices to insert the resistive element 16 in the same manner as in FIG. 10.

Figure 13:
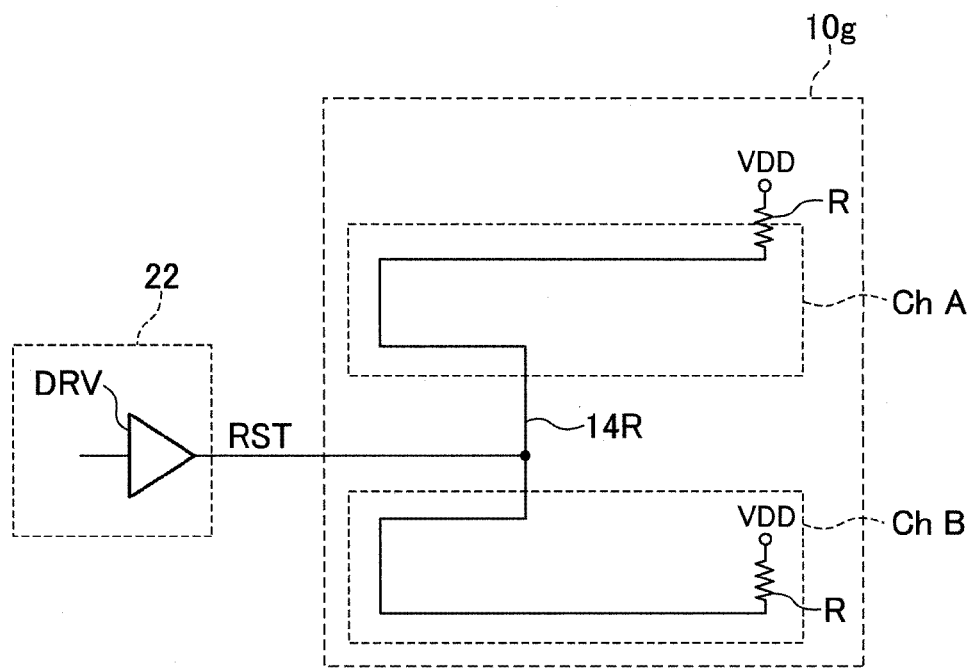
FIG. 13 is a wiring model applied when a resistive element R is used for the anti-resonance element 15 in a semiconductor module 10g including channels ChA and ChB.

An output driver DRV shown in FIG. 13 is a circuit included in the controller 22 and supplies the reset signal RST to the semiconductor module 10g. Because the channel ChA and the channel ChB operate independently, the address signal ADD and the like are separately supplied while the reset signal RST is commonly supplied. Because the reset signal RST is fixed to a high level during the normal operation as mentioned above, connection of the reset signal line 14R to a power supply voltage VDD through the resistive element R causes no problem. However, a voltage of the reset signal RST is required to be equal to or lower than a threshold voltage at the time of reset and thus a resistance of the resistive element R needs to be designed considering this requirement.

Assuming an example where the power supply voltage VDD is 1.5 V, a low-level threshold voltage of the reset signal RST is 0.3 V, and an on resistance Ron of the output driver DRV is 19Ω (ohms), the resistance of the resistive element R needs to be beyond 152Ω to set the level of the reset signal line 14R lower than 0.3 V at the time of reset (that is, when the output driver DRV outputs a low level). For example, it suffices to design the resistance of the resistive element R to about 200Ω with ensuring a certain margin.

Figure 14:
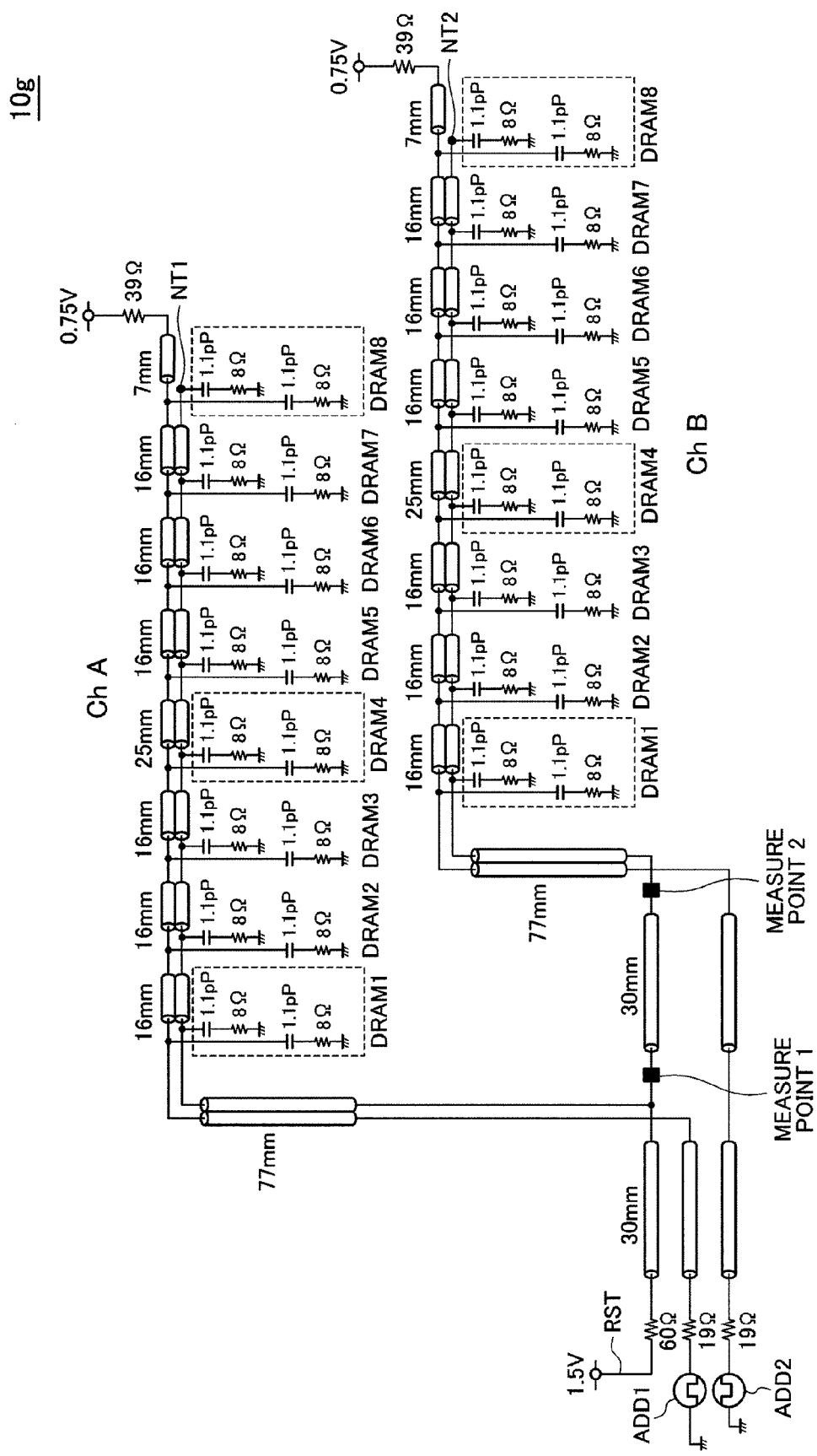
FIG. 14 is a wiring model for simulating a resonance phenomenon that occurs in the semiconductor module 10g.

Turning to FIG. 14, the semiconductor module 10g includes 16 DRAMs and is divided into the channels ChA and ChB each including eight DRAMs. As mentioned above, the address signals ADD and the like to be supplied to the channels ChA and ChB are separate signals, respectively, while the reset signal RST is a common signal. In this case, noises appearing on the reset signal line 14R are simulated assuming that resistance components and capacitance components added to the address signal line 14A and the reset signal line 14R and lengths of the lines are as shown in FIG. 14, and that an address signal ADD1 supplied to the channel ChA and an address signal ADD2 supplied to the channel ChB have opposite phases. It is assumed that frequencies of the address signals ADD1 and ADD2 are 133 MHz.

Figure 15:
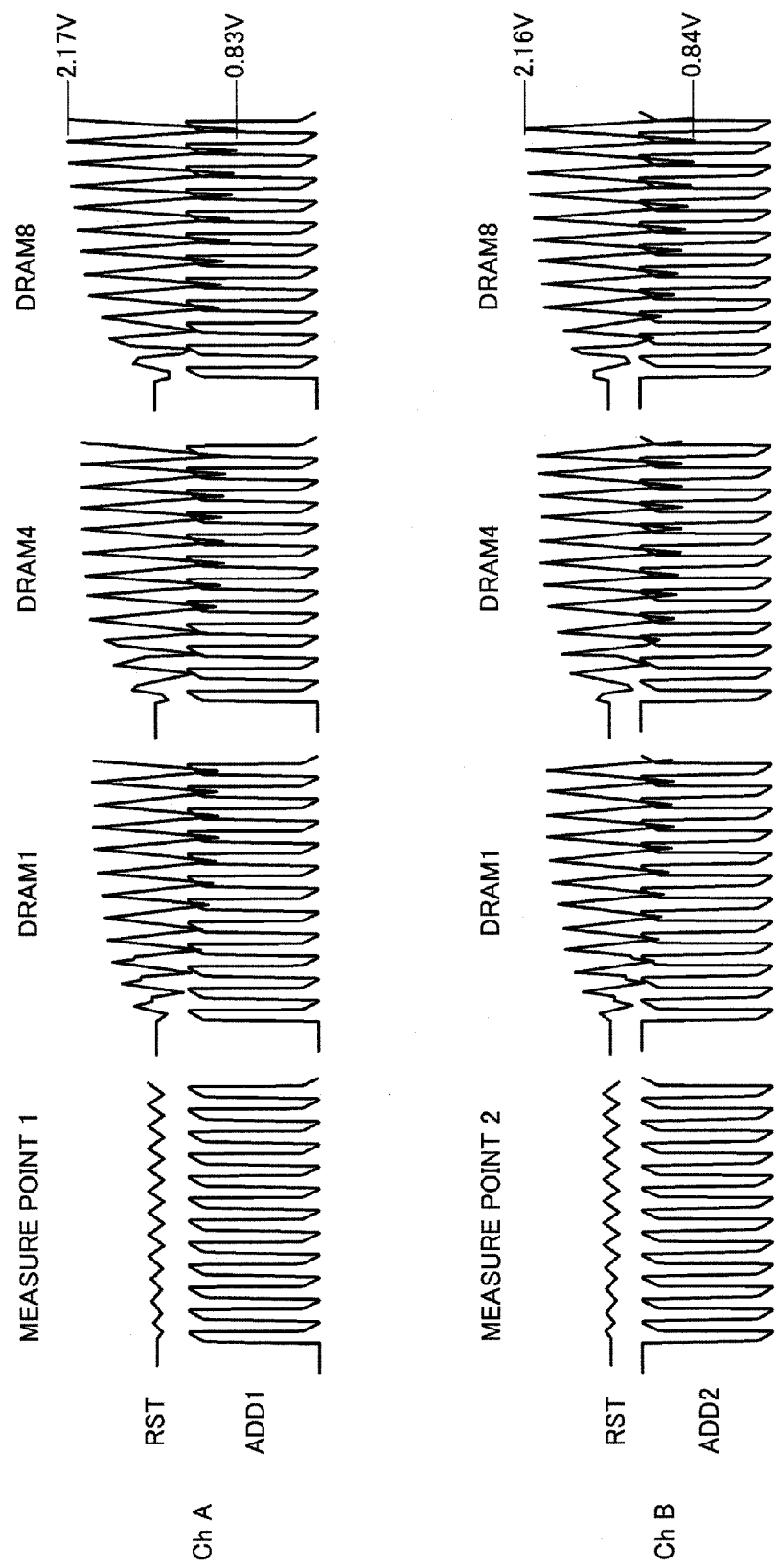
FIG. 15 shows a simulation result obtained when the ends NT1 and NT2 of the reset signal line 14R are opened.

It can be understood from FIG. 15 that, when the ends NT1 and NT2 of the reset signal line 14R are opened, the level of the reset signal line 14R greatly fluctuates due to a resonance phenomenon although the reset signal RST is fixed to a high level. Amplitudes of the fluctuations are larger at positions closer to the end NT1 or NT2, which indicates that the open tube causes resonances.

Figure 16:
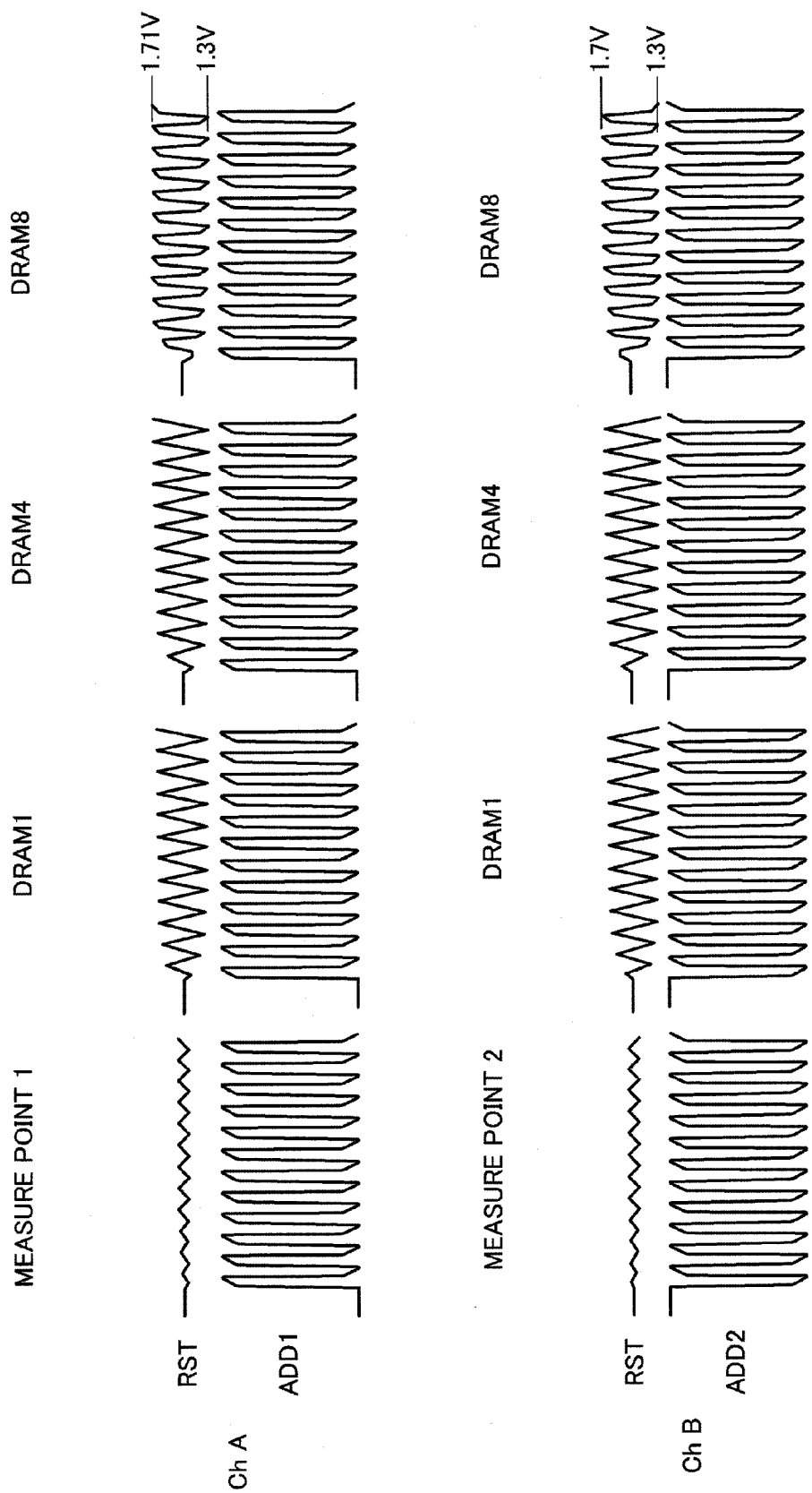
FIG. 16 shows a simulation result obtained when 200-Ω resistive elements R are connected to the ends NT1 and NT2 of the reset signal line 14R, respectively.
Figure 17:
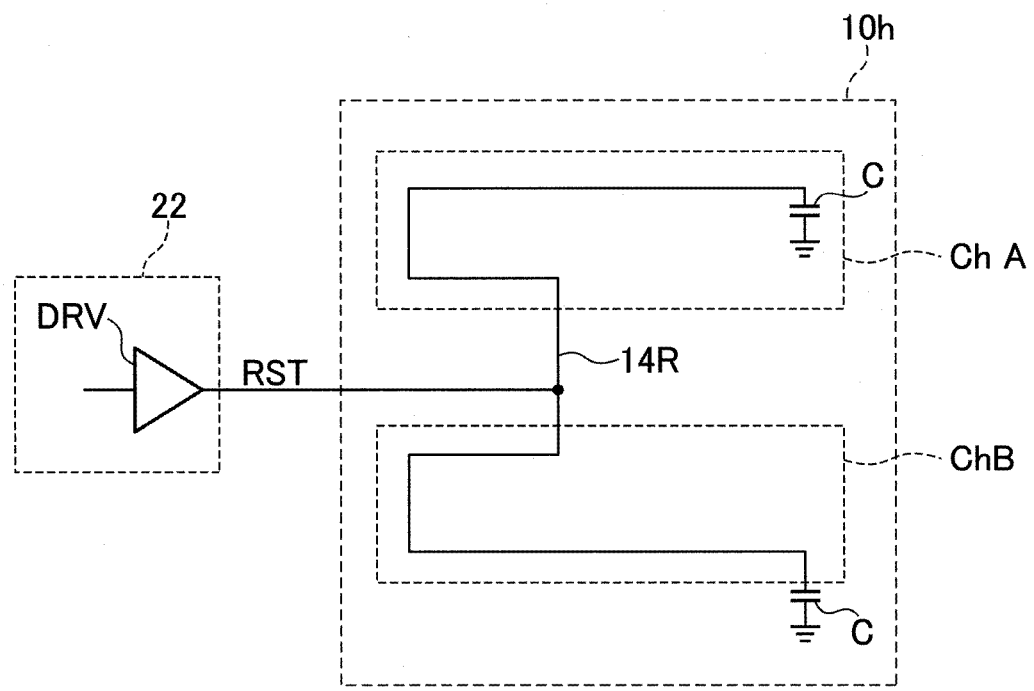
FIG. 17 is a wiring model applied when a capacitive element C is used for the anti-resonance element 15 in a semiconductor module 10h including channels ChA and ChB.

It is can be understood from FIG. 16 that the resonance phenomenon is greatly suppressed when the 200-Ω resistive elements R are connected to the ends NT1 and NT2 of the reset signal line 14R, respectively.

Because the capacitive element C has a sufficiently large direct-current resistance, it suffices to design a capacitance thereof in terms of suppressing resonances. In an example where an on resistance Ron of the output driver DRV is 19Ω and a wiring model is the same as that in the example shown in FIG. 14, it suffices to design the capacitance of the capacitive element C to about 15 picofarads (pF).

Figure 18:
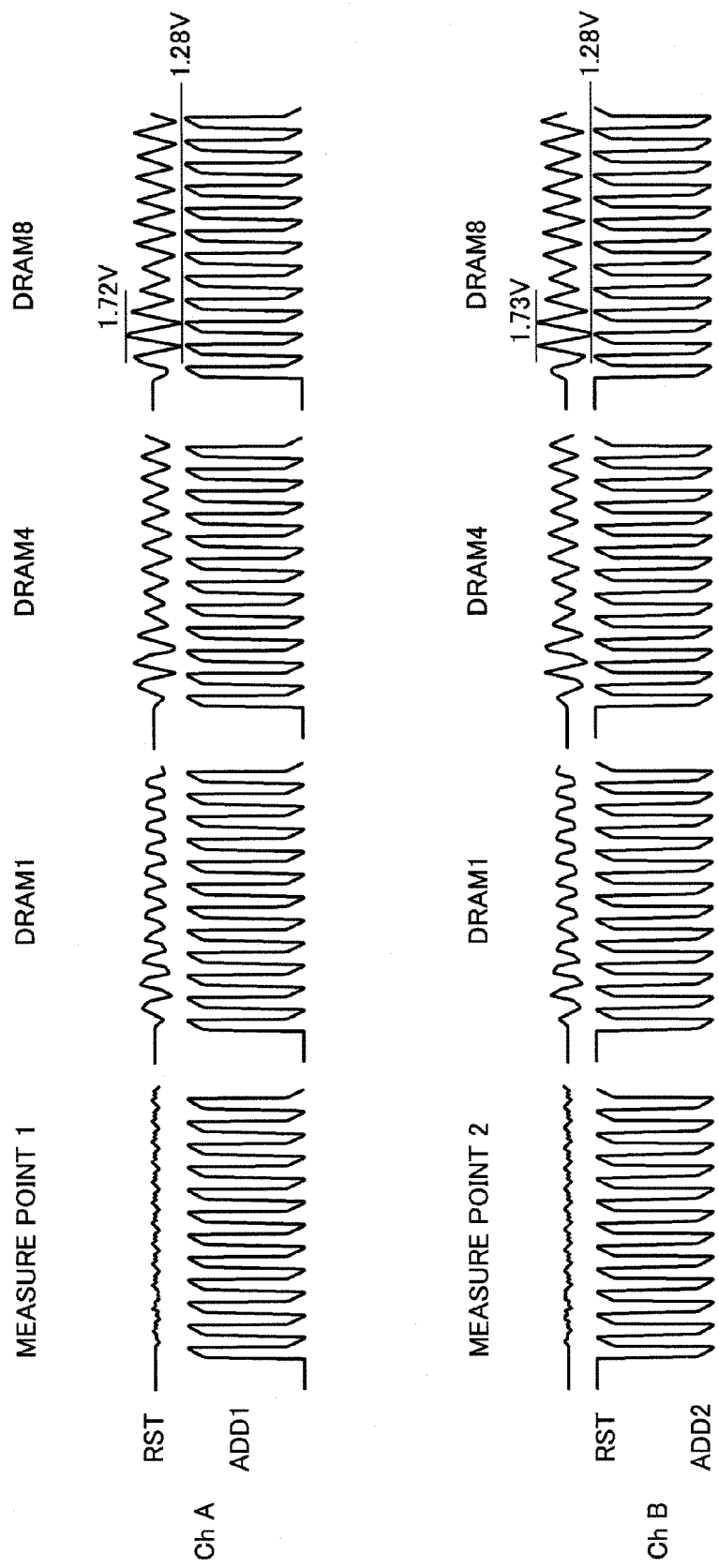
FIG. 18 shows a simulation result obtained when 15-pF capacitive elements C are connected to the ends NT1 and NT2 of the reset signal line 14R, respectively.

Turning to FIG. 18, simulation conditions are the same as those mentioned above. It can be understood from FIG. 18 that the resonance phenomenon is greatly suppressed when the 15-pF capacitive elements C are connected to the ends NT1 and NT2 of the reset signal line 14R, respectively.

Figure 19:
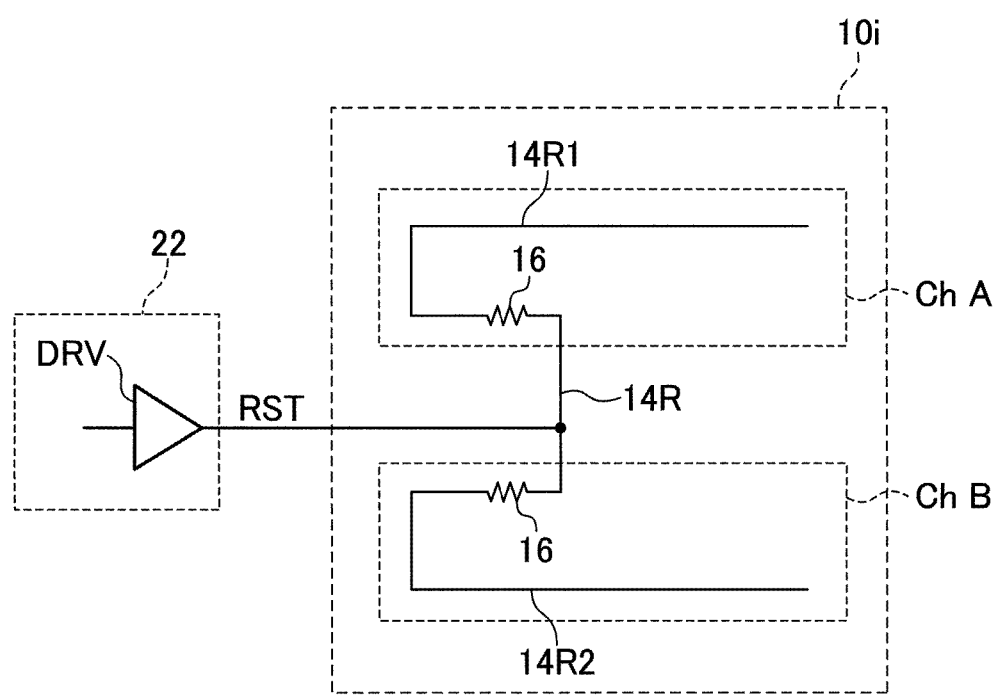
FIG. 19 is a wiring model applied when the resistive elements 16 are inserted into the reset signal line 14R in a semiconductor module 10i including channels ChA and ChB.

In an example shown in FIG. 19, the resistive elements are inserted into the branch lines 14R1 and 14R2, respectively. In this example, the reset signal line 14R is not pull-up connected unlike in the example shown in FIG. 13 and thus it suffices to design resistances of the resistive elements 16 in terms of suppressing resonances. In an example where an on resistance Ron of the output driver DRV is 19Ω and a wiring model is the same as that shown in FIG. 14, it suffices to design the resistances of the resistive elements 16 to about 10Ω.

Figure 20:
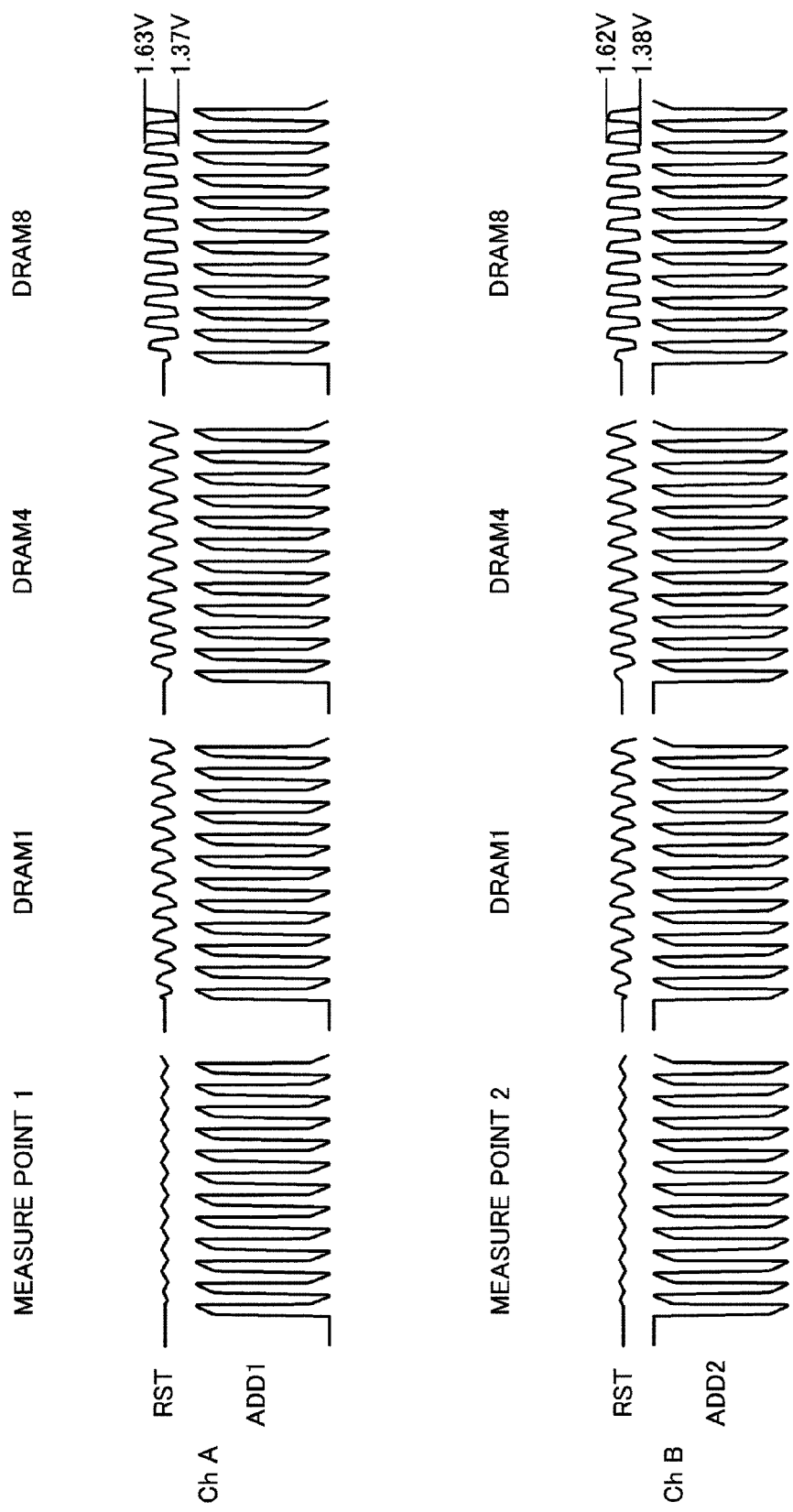
FIG. 20 shows a simulation result obtained when 10-Ω resistive elements 16 are inserted into the branch lines 14R1 and 14R2, respectively.

Turning to FIG. 20, simulation conditions are the same as those mentioned above. It can be understood from FIG. 20 that the resonance phenomenon is greatly suppressed when the 10-Ω resistive elements 16 are inserted into the branch lines 14R1 and 14R2, respectively.

The examples in which the resonance phenomenon is prevented by connecting the anti-resonance element to the reset signal line 14R have been explained above. A method of designing the reset signal line to a length that causes no resonance considering a frequency and the like of a signal source, which is a factor of crosstalk, is explained below.

Turning to FIGS. 21A and 21B, FIG. 21A shows an example where a clock frequency is 533 MHz and FIG. 21B shows an example where a clock frequency is 667 MHz.

A resonance phenomenon occurs when a relation $$d=N/\{2(f0/2n)tpd\}$$

is established, where a line length is d, a clock frequency is f0, and a propagation time is tpd. In this case, n and N are arbitrary natural numbers. In an example where the clock frequency f0 is 533 MHz and the propagation time tpd is 8.81 ns/m, a fundamental vibration at a resonance frequency of 266 MHz occurs when d=213 millimeters (mm). Assuming that the clock frequency f0 is 667 MHz and the propagation time tpd is 10.5 ns/m, a fundamental vibration at a resonance frequency of 333 MHz occurs when d=143 mm. Various resonances occur when the line lengths d are integral multiples of the above values.

Therefore, to cause resonances to be inherently hard to occur, it suffices to set the length d of the reset signal line 14R constituting an open tube to a value that causes no resonance. Specifically, in the configuration shown in FIG. 6A, it suffices to set the distance between the ends NT1 and NT2 to a value that causes no resonance. Additionally, in the configuration shown in FIG. 6B, it suffices to set the distance from the end NT1 or NT2 of one of the semiconductor modules 10a to the end NT1 or NT2 of the other semiconductor module 10a to a value that causes no resonance. In the configuration shown in FIG. 6C, it suffices to set the distance from the end NT3 of one of the semiconductor modules 10b to the end NT3 of the other semiconductor module 10b to a value that causes no resonance.

A method of increasing the length of an open tube configuration or a method of eliminating the open tube configuration to cause the reset signal line to be inherently hard to resonate is explained.

Figure 22:
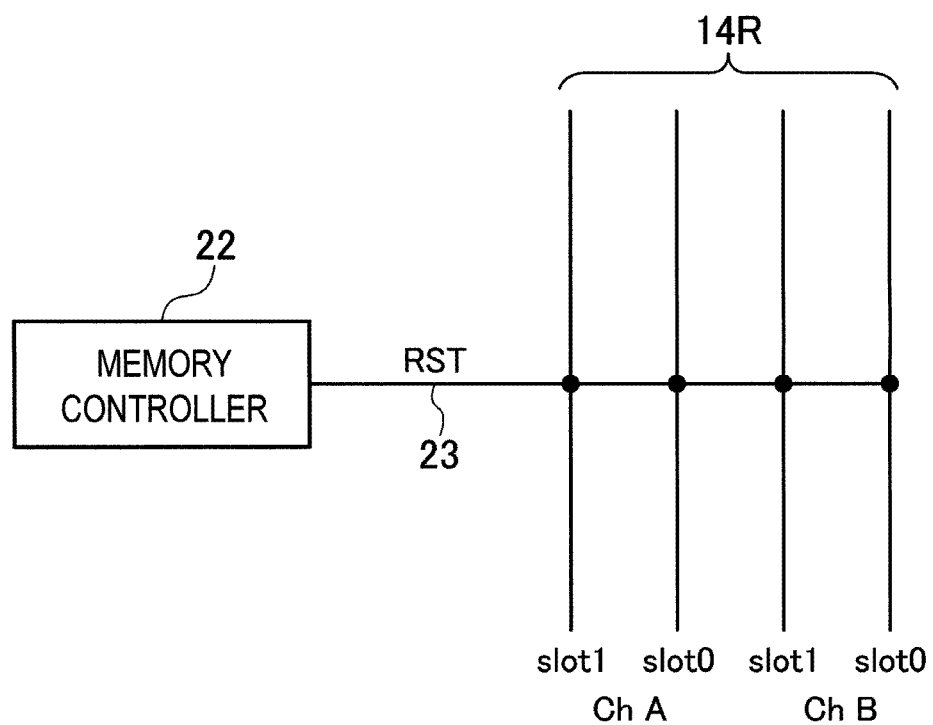
FIG. 22 is a schematic wiring diagram indicative of an embodiment of a state where semiconductor modules each including channels ChA and ChB are connected to two slots slot0 and slot1, respectively.

Turning to FIG. 22, when the reset signal lines 14R for supply to the channels ChA and ChB of the respective slots are all short-circuited as shown in FIG. 22, an open tube is formed as explained with reference to FIG. 6B or 6C. In this case, both ends of the open tube have opposite phases in vibrations as large as odd multiples of the fundamental vibrations shown in FIG. 21. Therefore, resonances easily occur when the address signal ADD supplied to the channel ChA and the address signal ADD supplied to the channel ChB have opposite phases. On the other hand, the both ends of the open tube have the same phase in vibrations as large as even multiples of the fundamental vibrations shown in FIG. 21. Therefore, resonances easily occur when the address signal ADD supplied to the channel ChA and the address signal ADD supplied to the channel ChB have the same phase.

Figure 23:
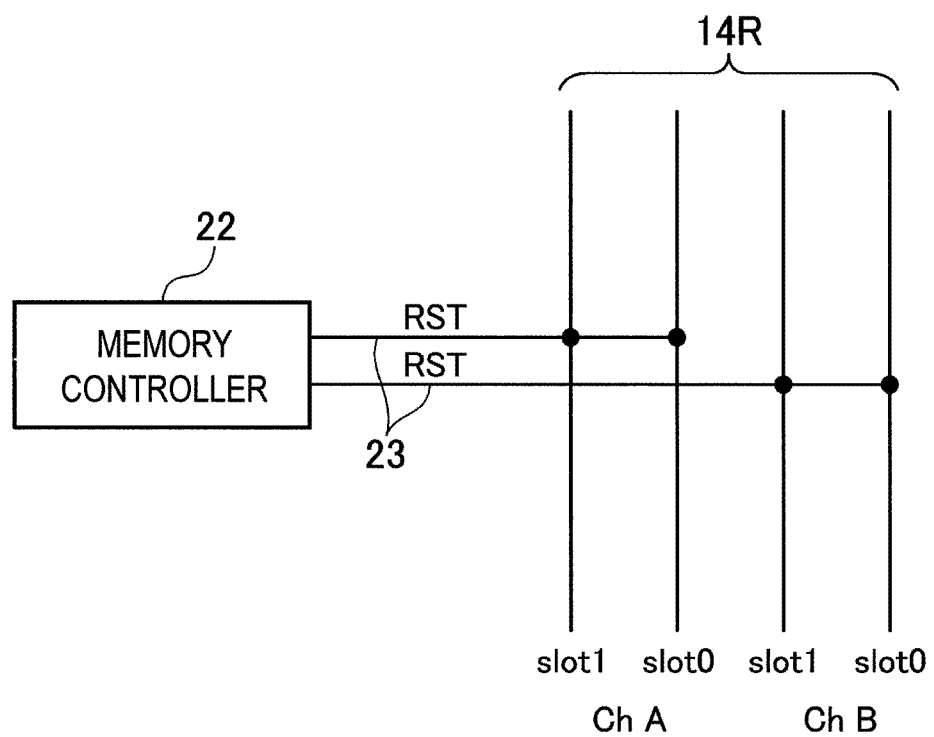
FIG. 23 is a schematic wiring diagram indicative of a first modification example.

Turning to FIG. 23, a reset signal line 14R for supply to the channel ChA and a reset signal line 14R for supply to the channel ChB are completed separated. To realize this example, an output driver DRV for the channel ChA and an output driver DRV for the channel ChB need to be provided in the memory controller 22 on the motherboard. When the reset signal line 14R for supply to the channel ChA and the reset signal line 14R for supply to the channel ChB are completely separated as in this example, an open tube across the channels ChA and ChB is not formed and thus resonances having vibrations as large as odd multiples of the fundamental vibration do not easily occur even when the address signals ADD having the opposite phases are supplied to the channels ChA and ChB, respectively.

Figure 24:
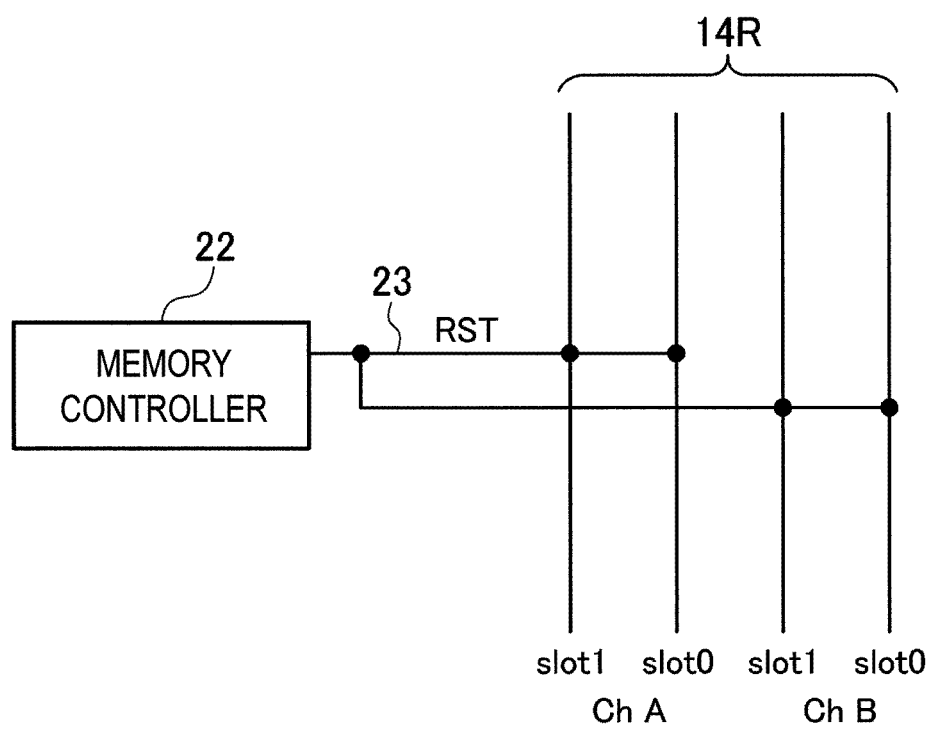
FIG. 24 is a schematic wiring diagram indicative of a second modification example.

Turning to FIG. 24, a reset signal line 14R for supply to the channel ChA and a reset signal line 14R for supply to the channel ChB are separated near the memory controller 22. In this example, there is no need to provide the output driver DRV for the channel ChA and the output driver DRV for the channel ChB in the memory controller 22. The reset signal line 14R for supply to the channel ChA and the reset signal line 14R for supply to the channel ChB are not completely separated in this example. However, distances between the memory controller 22 and the respective slots are practically sufficiently longer than distances between the slots and thus the length of an open tube becomes greatly longer than that in the wiring example shown in FIG. 22. Accordingly, it is possible to easily avoid the lengths that cause resonances shown in FIG. 21 and also possible to considerably lower frequencies that possibly cause resonances, thereby preventing occurrence of substantial resonances.

Figure 25:
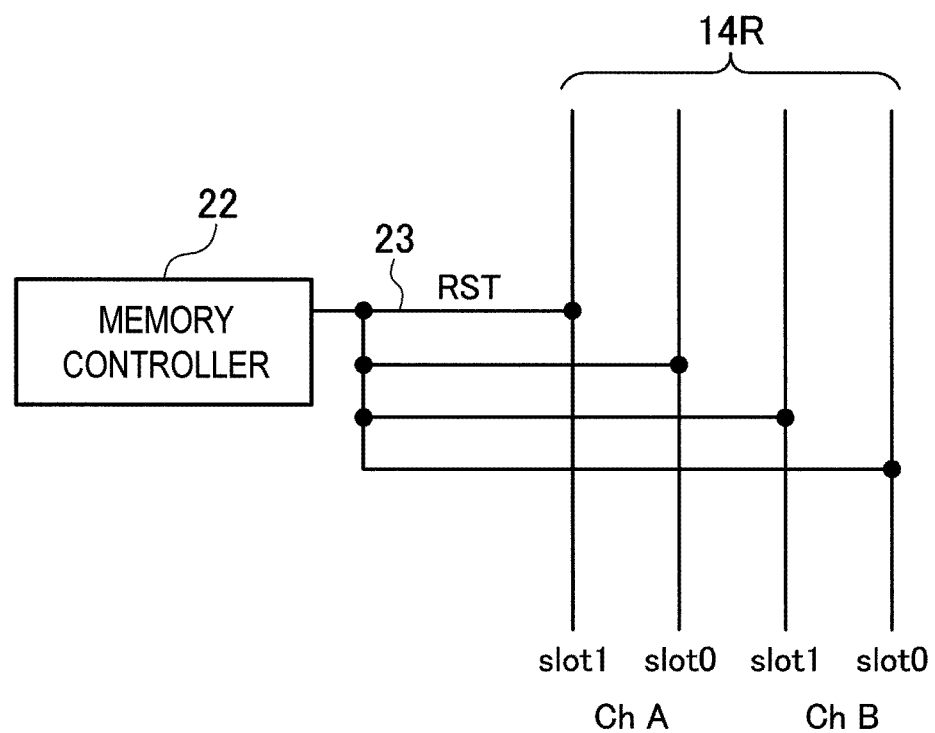
FIG. 25 is a schematic wiring diagram indicative of a third modification example.

Turning to FIG. 25, reset signal lines 14R for supply to the respective channels of the respective slots are all separated near the memory controller 22. According to this example, the length of an open tube formed in the same channel is greatly increased as well as the effect of the modification example shown in FIG. 24 is obtained. Therefore, in addition to the effect of the modification example shown in FIG. 24, it is possible to easily avoid the lengths that cause resonances and also possible to considerably lower frequencies that possibly cause resonances, thereby preventing occurrence of substantial resonances.

Figure 26:
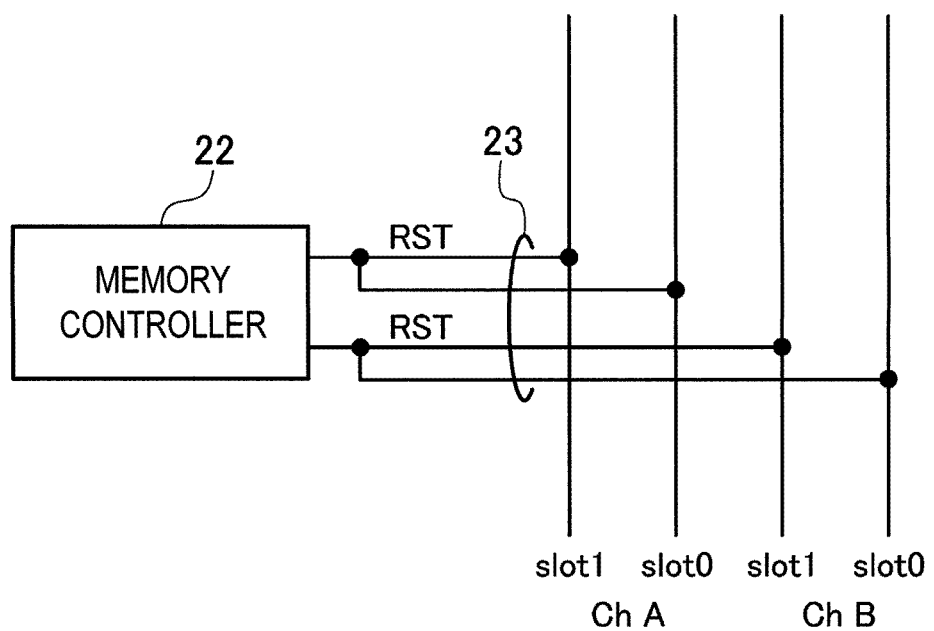
FIG. 26 is a schematic wiring diagram indicative of a fourth modification example.

Turning to FIG. 26, a reset signal line 14R for supply to the channel ChA and a reset signal line 14R for supply to the channel ChB are completely separated and also lines corresponding to different slots are separated near the memory controller 22. According to this example, the same effect as that of the example shown in FIG. 23 is obtained between the different channels and also the same effect as that of the example shown in FIG. 25 is obtained in the same channel.

Figure 27:
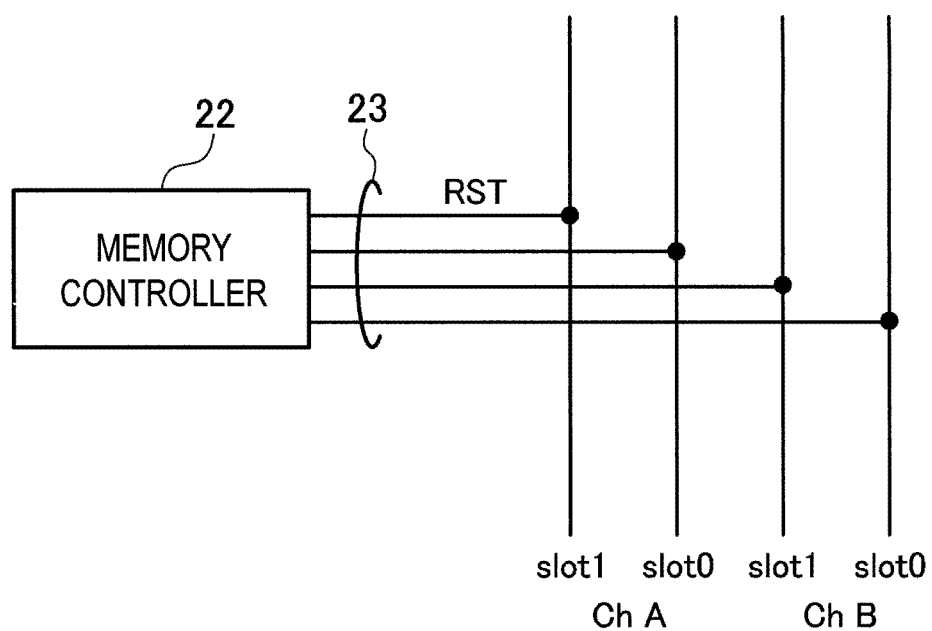
FIG. 27 is a schematic wiring diagram indicative of a fifth modification example.

Turning to FIG. 27, reset signal lines 14R for supply to the respective channels of the respective slots are completely separated. To realize this example, four output drivers DRV need to be provided in the memory controller 22. According to this example, no open tube is formed through the line 23 on the motherboard, which causes resonances to be quite hard to occur.

It is apparent that the present invention is not limited to the above embodiments, but may be modified and changed without departing from the scope and spirit of the invention.

Cases in which the reset signal RST causes resonances due to changes of the address signal ADD have been used as examples and the methods of preventing these cases have been explained in the embodiments. However, the present invention is not limited to these cases. Therefore, the present invention is applicable to all cases in which not only the reset signal but also a signal having a level fixed during a normal operation causes a resonance phenomenon due to not only the address signal but also a signal having a variable level during the normal operation.

What is claimed is:

1. A semiconductor module comprising:
   a plurality of semiconductor chips each including a reset terminal to which a reset signal is supplied, and an internal circuit that is initialized based on the reset signal; and
   a module substrate on which the semiconductor chips are mounted,
   wherein the module substrate comprises a reset signal line connected to the reset terminals of the semiconductor chips, and an element for suppressing resonances on the reset signal line.

2. The semiconductor module as claimed in claim 1, wherein the element for suppressing resonances on the reset signal line includes a termination element connected to a termination of the reset signal line.

3. The semiconductor module as claimed in claim 2, wherein the termination element includes at least one of a resistive element, a capacitive element, and a diode.

4. The semiconductor module as claimed in claim 1, wherein the element for suppressing resonances on the reset signal line includes a resistive element inserted into the reset signal line.

5. The semiconductor module as claimed in claim 1, wherein the module substrate further comprises an address signal line that is provided along the reset signal line.

6. The semiconductor module as claimed in claim 5, wherein each of the semiconductor chips further includes an address terminal to which an address signal is supplied through the address signal line, and the internal circuit provided in each of the semiconductor chips operates according to the address signal.

7. The semiconductor module as claimed in claim 6, wherein
   the semiconductor chips are classified into at least first and second channels,
   the address signal line includes at least first and second address signal lines,
   the semiconductor chips belonging to the first channel are commonly supplied with a first address signal through the first address signal line, and
   the semiconductor chips belonging to the second channel are commonly supplied with a second address signal through the second address signal line.

8. The semiconductor module as claimed in claim 6, wherein
   the reset signal line includes a common line, and at least first and second branch lines that branch from the common line, and
   a line distance from a termination of the first branch line to a termination of the second branch line is different from a distance in which periodic changes of the address signal cause resonances on the reset signal line due to crosstalk from the address signal line to the reset signal line.

9. A semiconductor device comprising:
   a motherboard;
   a semiconductor module mounted on the motherboard; and
   a controller mounted on the motherboard and supplying a reset signal to the semiconductor module, wherein the semiconductor module comprises:
- a plurality of semiconductor chips each including a reset terminal to which the reset signal is supplied, and an internal circuit that is initialized based on the reset signal; and
- a module substrate on which the semiconductor chips are mounted; and wherein the module substrate comprises a reset signal line for the reset signal, and an element for suppressing resonances on the reset signal line.

10. The semiconductor device as claimed in claim 9, wherein a plurality of the semiconductor modules are mounted on the motherboard.

11. A semiconductor module comprising:
- a module substrate;
- first and second signal lines provided along each other on the module substrate;
- a semiconductor chip that is mounted on the module substrate and to which first and second signals are supplied through the first and second signal lines, respectively; and
- an element for suppressing resonances on the first signal line due to crosstalk from the second signal line to the first signal line.

12. The semiconductor module as claimed in claim 11, wherein
- the first signal is activated to a first logic level at a time of start-up and fixed to a second logic level during a normal operation after the start-up,
- the second signal changes between the first logic level and the second logic level during the normal operation, and
- the element for suppressing resonances fixes the first signal to the second logic level to prevent periodic changes of the second signal during the normal operation from causing resonances on the first signal line due to crosstalk from the second signal line to the first signal line.

13. The semiconductor module as claimed in claim 12, wherein threshold voltages of the first and second signals for distinguishing the first and second logic levels are different from each other.

14. The semiconductor module as claimed in claim 12, wherein the first signal is a reset signal for initializing the semiconductor chip, and the second signal is an address signal for specifying an address in the semiconductor chip.

* * * * *